July 19, 1949.
H. B. DAY
2,476,708
VISUAL TRAINING SIGNALING MEANS
Filed March 26, 1945
2 Sheets-Sheet 1
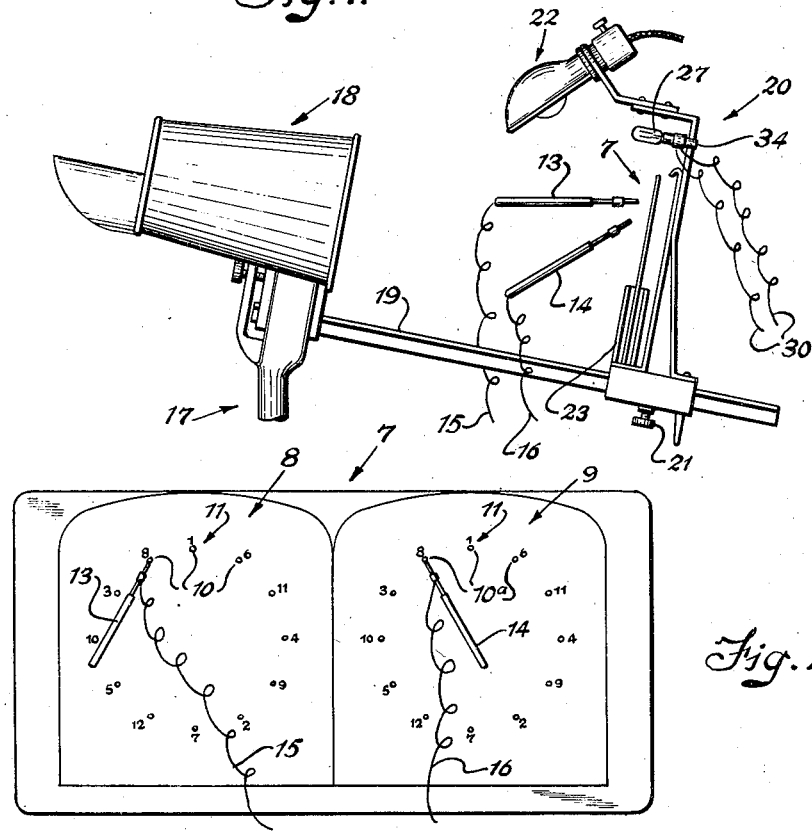
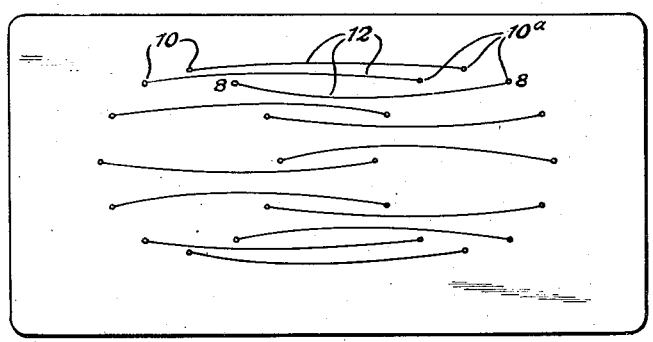
Inventor
Henry B. Day.
By Clarence A. O'Brien
and Harvey B. Jacobson
Attorneys

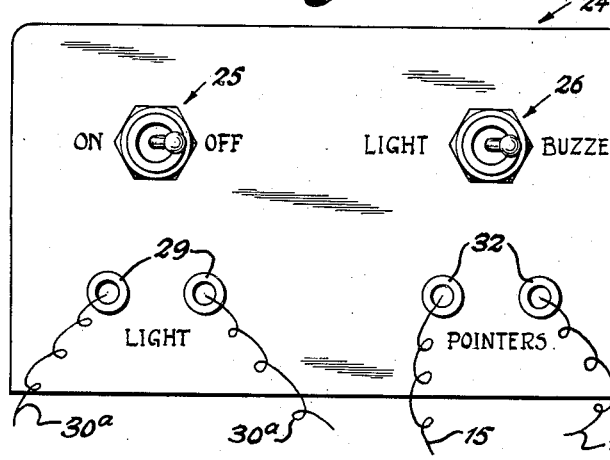
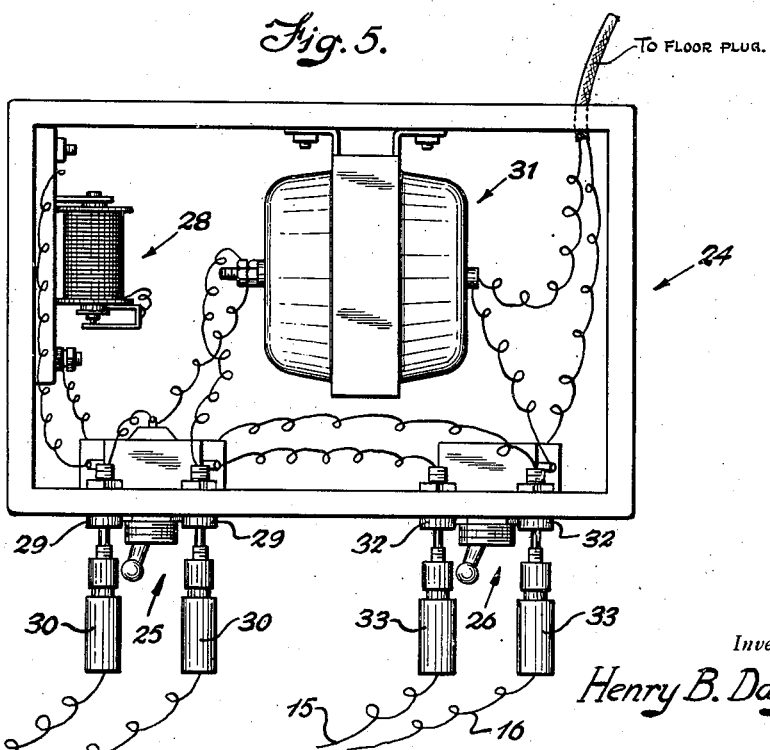

Patented July 19, 1949

2,476,708

UNITED STATES PATENT OFFICE 2,476,708

VISUAL TRAINING SIGNALING MEANS

Henry B. Day, Raleigh, N. C.

Application March 26, 1945, Serial No. 584,805

4 Claims. (Cl. 35—22)

The present invention has to do with ways and means of testing visual skills and has more particular reference to the now somewhat commonly known pointer method and technique used in connection with visual skills training, it being the principal object of the invention, as will be later seen, to achieve more final and desirable results through the use of audible and visible signalling and indicator devices to establish efficient, accurate and comfortable binocular vision.

It is believed advisable, if not necessary, that certain preliminary information be here included in order to provide a foundation as well as an informative background to better understand the improvements which which we are here involved. To this end, it is sufficient to introduce, in a general way, the so-called "Keystone" visual skills training by stereographs. Briefly, here are relevant factors:

"When presenting procedures for the training of the visual skills, it should be remembered that such procedures must be consistent with the established laws of learning. Such methods are based on the idea that seeing is a learned act and that the unsatisfactory performance of the muscles concerned with seeing is not usually due to 'weak muscles' but is due rather to their anomalous behavior, which is accompanied by impaired motor and perceptual skills.

"When we observe visual behavior, we are observing the accessory muscular associations underlying the learned act of seeing, associations which must precede the phenomenon of seeing. We must therefore work through previously learned postural habits in order to re-educate the existent visual behavior and to establish eventually skilled visual performance and eradicate the symptoms of anomalous visual behavior.

"Anomalous visual behavior often gives rise to occular and other obscure symptoms commonly ascribed to 'eyestrain.' Such symptoms do not always yield to the prescription of lenses. In such an instance the reeducation of the visual skills by means of vision training offers a solution for these problems."

For the purposes of reeducating visual behavior certain now well adapted instrumentalities have been employed. The one with which we are presently concerned is that which has to do with the pointer technique. In connection with the above "Keystone" method the following general procedure is pursued:

"In the pointer method the subject is given two pointers, which are about the length of an ordinary pencil and which have colored tips. He is instructed to hold the pointers about two inches from their respective tips, as he would a pencil. During training, while viewing a stereogram or stereograph through the Telebinocular and endeavoring to place the pointers—which simulate elongated fingers—accurately on the targets within the stereogram, the subject may be kept constantly and completely aware of the motor and perceptual visual behavior of each eye individually. Any motor or perceptual instabilities may be censored by both the subject and the technician, and corrections in the visual behavior may be attempted immediately."

My device is an improvement of the "pointer method" technique of visual training. As indicated above, this technique is performed by having the subject look at stereoscopic views or slides, having right and left companion fields. In both fields there are like targets containing numbers of varying separations which within themselves create stereoscopic effects. The stereoscopic views are observed in any stereoscope of the table type so that both hands are free for further use. The subject is then given a pointer in each hand, and instructed to land the pointers on each subsequent targets with landings of both pointers made simultaneously. The subject attempts to make the landings as instructed. The landings will appear to the subject as accurate but are often quite inaccurate. One or both pointers will be landed inaccurately.

An observer is, therefore, necessary to constantly stand over the subject to direct him and make sure that he does not teach himself undesirable and incorrect responses in the visual behavior pattern. If the subject continues to make inaccurate landings, the observer must have the subject hold the pointers at their landing positions and move his head from the stereoscope and observe the direction and extent of his failure in order to be able to place the pointers accurately. By removal of the subject's head from the stereoscope, outside interference will distract from his full attention and when he places his head back into the instrument he will have to readjust and orient himself to his task again.

I supplement the method and technique by using an audible and visible indicator which consists of a buzzer in a small box and a detachable cord with a socket, light and clip that can be attached to any ordinary stereoscope over the stereoscopic views. From this small box there are two detachable cords which have metal pointers on the ends, one in red and one in green. At the proper points of landing on each corresponding target of each companion field is placed a metal contact point through the card which is connected with a thin wire to metal contact point of corresponding target of opposite companion field. When metal contact points are touched with the electrical pointers the circuit is completed to give an audible or visible indication. In this way if inaccurate landings are made there will be no audible or visible indication. The subject by moving the electrical pointers can then find the correct landings as well as observe the distance of his inaccurate landing without moving his head from the stereoscope.

Other phases, steps, features and advantages of the invention will become more readily apparent from the following description and the accompanying illustrative drawings.

In the drawings, wherein like numerals are employed to designate like parts through the views:

Figure 1 is a side elevational view of a conventional table type stereoscope including the slide, a stereograph and showing the telltale or indicator light and the so-called electrified pointers.

Figure 2 is a face or plan view of a stereograph with duplicate stereoscopic views, this modified in accordance with the principles of the present invention showing the pointers making a correct landing.

Figure 3 is a plan or elevation of the opposite side of the stereograph card showing uncovered wires connecting the companion landing or contact points.

Figure 4 is a front elevation of the aforementioned small box with the mechanism with which the landing pointers associate themselves.

Figure 5 is a top view with the lid removed to show the details on the interior of the box.

It is perhaps advisable to refer first to the card denoted by the numeral 7 in Figures 2 and 3. The face of the card, the side which the observer sees when it is in use is of the conventional "Keystone" type in that it includes companion fields each characterized by predetermined diagrammatical charts, pictorial and other scenic backgrounds and subjects, 8 and 9, these field or areas being duplicates of one another insofar as data and arrangement of components thereof are concerned. The regular or conventional card referred to is such that the predetermined landing points 10 and 10a are substantially identical, that is to say they occur at precisely the same points or approximately so within the range of each field 8 or 9 as the case may be. And, of course, in practice there are multitudes of different varieties of stereograph cards with the views fields and subjects matter differing. But basically and in principle they are like the card illustrated in Figure 2, for example. As far as the face of the card is concerned the only difference over equivalent cards now in use is the fact that we see metal contacts or buttons 11, these registering with the landing points which in this instance are numbered from 1 to 12 but with the order of sequence of the numbers arranged according to plan. However, the only difference so far as the base of the card is concerned is the presence of the contact buttons or points 11. On the back of the card the principal difference is that the respective contact buttons, the ones in the left field corresponding to those in the right field are wired together by circuit or current-conducting wires 12. It follows that when the two pointers 13 and 14 makes a satisfactory or proper landing it may serve to close a signal circuit which, as before stated, may be either audible or visible according to the choice of the user.

As before indicated, the pointers 13 and 14 are simply constructed with appropriate handles and metal ball shanks to which current-conducting wires 15 and 16 are connected.

Referring now to the general assemblage illustrating the use in Figure 1, it will be noted that the numeral 17 designates a suitable stand for an appropriate stereoscope 18. The stand is provided with a guide 19 for the rack 20, this rack having a retaining set screw 21, an electric bulb or lamp 22, that is a reading lamp and rack means 23, more or less conventional to accommodate the stereograph or card 7.

Referring now to Figures 4 and 5, it will be seen that the numeral 24 designates an appropriate box or container and on the panel of this, as seen in Figure 4, is an "off-on" switch 25. At the opposite side is a selector switch 26 for controlling either the signalling "light" 27 (see Figure 1) or buzzer 28 (see Figure 5). The sockets 29 serve to accommodate insertable and removable plugs 30 for supplying current to the signal light 27 by way of wires 30a and transformer 31 on the interior of the box. The sockets 32 serve to accommodate the adapter plugs 33 which supply current to the pointers 13 and 14. In Figure 5 we see, somewhat diagrammatically, the wiring arrangement for bringing either the light or buzzer into play whichever is desired, at the time, for use.

In practice I have found that the portable signalling means, that is, the buzzer 28 is preferred by young folks, especially children, as it makes a more effective impression when they land the pointers on the proper contacts to close the circuit. But older and more sedate patients would object to the buzzer and would much prefer the light. The signal light is, therefore, provided with a clip 34, as shown in Figure 1, so that it can be properly snapped on the fixture as illustrated. Thus, the principal source of illumination is from the lamp 22 against the card 7 and the smaller bulb 27 gives the signal when a proper landing has been made.

In practice the subject is seated to peer through the stereoscope 18 in an obvious fashion in order to view the stereogram or stereograph, as the case may be, this indicated at 7. The training is given with lenses on if they are habitually worn, or with them off if it is desired for some reason to train without them. Learning takes place by trial and error as is obvious. The patient, if he is already familiar with the procedure, will appreciate at once the added advantage of receiving either audible or visible signals when landings are made. Where no previous training has been had, the invention is all the more effective since it assists the uninitiated to quickly orient the position of the body in hands and to establish proper senses and to otherwise coordinate the muscles and faculties.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. In a stereographic-type visual skills training apparatus employing the pointer method and technique of testing including a relatively fixed stereoscope and a stereograph holder adjustably supported from the stereoscope adjustably focusing the stereograph for the testee, means for obtaining the result of a testee's examination as to eye coordination comprising a signal equipped power supply unit, current conducting pointers for use in the right and left hands of the testee, said pointers being in electric circuit connection with said unit, a stereograph viewing slide adapted for use in said holder having right and left fields of observation, a contact button operatively mounted at a predetermined locale in one field, a second contact button mounted at an approximately corresponding locale in the other field, and a wire electrically connecting said contact buttons, the latter when viewed through said stereoscope being seen as one, whereby when said pointers are correctly and simultaneously landed on both contact buttons the testee is instantly notified by the signal given.

2. The structure specified in claim 1, wherein the stated locale for each contact button is denoted by an associated and singularly displayed landing zone and wherein the landing zones in both fields are similar to one another.

3. The structure specified in claim 1 wherein the stated locale for each contact button is denoted by an associated and singularly displayed landing zone and wherein the landing zones in the respective fields are similar to each other and wherein each landing zone is identified by the same numeral, for example, the numeral 1.

4. A stereograph for use in connection with a pointer-type visual training method of the class shown and described comprising a viewing slide provided on its obverse face with a pair of right and left companion fields encompassing predetermined landing spots for manually manipulated circuit make and break pointers, the sites occupied by said landing spots in one field corresponding in location to the sites occupied by similar landing spots in the remaining field, selectively usable electrical contacts coinciding with each and all of said landing spots, and current conducting wires connecting respective and established pairs of corresponding and mating contacts in the respective fields.

HENRY B. DAY.

REFERENCES CITED

The following references are of record in the file of this patent:

UNITED STATES PATENTS

| Number | Name | Date |
|---|---|---|
| 1,647,276 | Daman | Nov. 1, 1927 |
| 1,803,040 | Pacent | Apr. 28, 1931 |
| 1,810,529 | Rice | June 16, 1931 |
| 1,860,895 | Marx | May 31, 1932 |
| 1,948,901 | Brombach | Feb. 27, 1934 |
| 1,968,461 | Lobeck | July 31, 1934 |
| 2,139,860 | Schwerdeman | Dec. 13, 1938 |
| 2,149,459 | Morehouse | Mar. 7, 1939 |
| 2,196,904 | Sherman | Apr. 9, 1940 |
| 2,307,981 | Babcock | Jan. 12, 1943 |
| 2,326,965 | Neumiller | Aug. 17, 1943 |

OTHER REFERENCES

Manual of Mental and Physical Tests, Part I, Whipple, 1924, pages 156–158.